United States Patent [19]

Brunér et al.

[11] Patent Number: 4,845,931
[45] Date of Patent: Jul. 11, 1989

[54] APPARATUS FOR A HARVESTING MACHINE

[75] Inventors: Hasse Brunér, Hjo; Lars I. Persson, Höganäs, both of Sweden

[73] Assignee: Rippelton, N.V., Curacao, Netherlands

[21] Appl. No.: 35,997

[22] PCT Filed: Jul. 22, 1985

[86] PCT No.: PCT/SE85/00289
§ 371 Date: Feb. 25, 1987
§ 102(e) Date: Feb. 25, 1987

[87] PCT Pub. No.: WO87/00393
PCT Pub. Date: Jan. 29, 1987

[51] Int. Cl.⁴ .......................................... A01D 67/00
[52] U.S. Cl. ....................................... 56/208; 56/10.2
[58] Field of Search ............... 56/10.2, 10.4, DIG. 15, 56/208

[56] References Cited

U.S. PATENT DOCUMENTS

| | | | |
|---|---|---|---|
| 3,137,984 | 6/1964 | Shonkwiler | 56/DIG. 15 |
| 3,383,845 | 5/1968 | Hirsch et al. | 56/DIG. 15 |
| 3,597,907 | 8/1971 | Neal | 56/208 |
| 3,623,301 | 11/1971 | Hofer | 56/208 |
| 3,731,470 | 5/1973 | Cornish et al. | 56/10.4 |
| 4,124,970 | 11/1978 | Bernhardt | 56/10.2 |
| 4,141,200 | 2/1979 | Johnson | 56/DIG. 15 |
| 4,191,006 | 3/1980 | Kerber et al. | 56/DIG. 15 |
| 4,193,250 | 3/1980 | Kessens et al. | 56/208 |
| 4,203,275 | 5/1980 | Vermeer | 56/208 |
| 4,204,383 | 5/1980 | Milliken, Jr. | 56/10.2 |
| 4,206,582 | 6/1980 | Molzahn et al. | 56/208 |
| 4,227,363 | 10/1980 | Kerber et al. | 56/10.2 |
| 4,409,778 | 10/1983 | McNaught | 56/10.2 |
| 4,541,229 | 9/1985 | Elijah | 56/10.2 |

Primary Examiner—Paul J. Hirsch
Attorney, Agent, or Firm—Nixon & Vanderhye

[57] ABSTRACT

Apparatus for a harvesting machine comprising a cutter bar, a reel assembly including a reel, and a rear table comprising a feeding auger and a feeding elevator, with the rear table being pivotable relative to the harvesting machine about a first horizontal axis of rotation. A pair of reel carrying arms are pivotally mounted about an axis of rotation on the rear table, and a movable feeding apron is mounted in front of the rear table. A cutter bar is provided at a leading end of the movable feeding apron, and a pair of levers are hingedly mounted on the rear table about a second horizontal axis of rotation. The levers have front arms and rear arms, with the sides of the feeding apron being connected to the front arms. A first hydraulic arrangement is mounted relative to the machine for pivotally moving the rear table about the first horizontal axis, and a second hydraulic arrangement is provided for supporting the reel assembly and causing pivotal movement of the pair of reel carrying arms. The second hydraulic arrangement extends between the pair of reel carrying arms and the movable feeding apron. A third hydraulic arrangement is connected to the rear arms of the levers for counter-balancing the feeding apron and the reel assembly supported by the feeding apron about the second axis of rotation. Ground following members are connected under the movable feeding apron for causing the feeding apron to follow a ground contour when the machine is advanced while at the same time raising or lowering the reel via the pair of reel carrying arms. In this way, collisions between the reel and the cutter bar are avoided when the cutter bar is working in a lower position and the feeding apron is raised by the ground following members due to elevation of the ground contour.

7 Claims, 3 Drawing Sheets

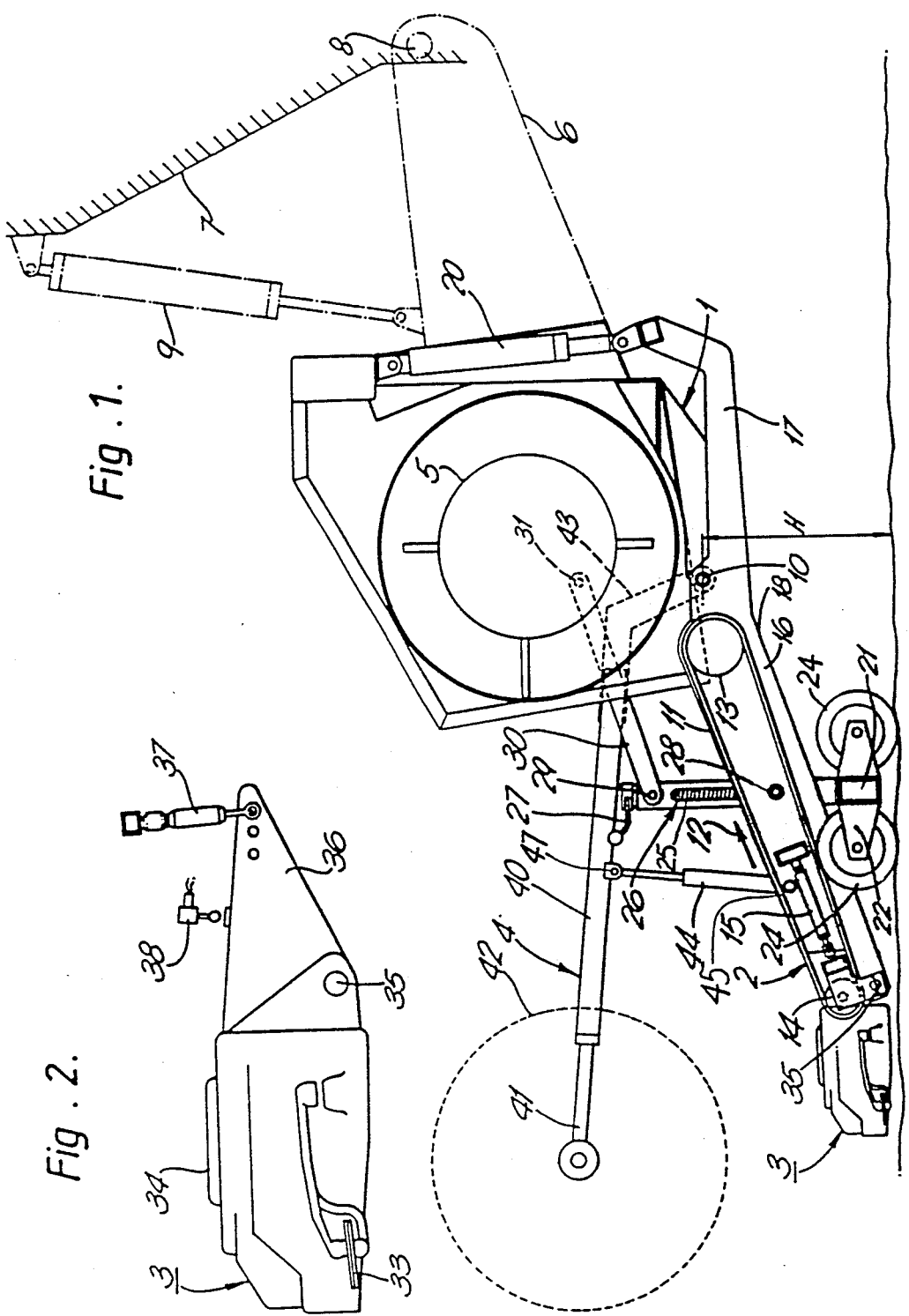

4,845,931

APPARATUS FOR A HARVESTING MACHINE

TECHNICAL FIELD

The invention relates to an apparatus for a harvesting machine comprising a cutter header with a cutter-bar in the front end thereof, a reel, a feeding auger, and a feeding elevator.

BACKGROUND ART

There are several demands made on the cutting header of a harvesting machine. The first demand is that the crop be cut at the desired height and be delivered as desired for further treatment in the harvester. Therefore, the cutting header must be adjustable in accordance with often very varied harvesting conditions or other specific demands. As an example may be mentioned the demands made on the header of a whole crop harvester, which include a very low stubble height. Prior art often includes adjustable skids in combination with a spring balancing system to make the header follow the ground contour closely. In this case it is very important that the header is well balanced. In other words the weight of the header must not exceed the carrying ability of the skids in case the skids run into an elevation. Otherwise the header easily digs into the ground, which implies a great risk for extensive damage. In other words, the header must be floating. It has been difficult to unite these demands according to prior art. This is especially true for very large and heavy cutter headers, with a great mass to be accelerated and hence a low mobility.

Prior art also includes the use of mobile headers in combination with sensing runners or other sensing elements underneath the cutter-bar, which detect unevenness of the ground and feed impulses to the hydraulic cylinders of the integrated cutting header. These known systems also include hydraulic balancing. The purpose is to control the set stubble height automatically. The existing systems have not, however, solved the above problem, and have in practice exhibited certain other drawbacks, such as a risk of having the reel run into the cutter-bar when working at a low height if the header is raised quickly as a result of the detectors sensing some elevation of the ground underneath the cutter-bar.

BRIEF DISCLOSURE OF THE INVENTION

The aim of the invention is to offer an improved solution of the above mentioned problems over what has been achieved in the prior art. In order to achieve this purpose the cutting header is divided into a rear table which is pivotable relative to the harvesting machine about a first horizontal axis of rotation by means of first hydraulic cylinders to be set in chosen stationary positions relative to the machine, said rear table comprising such heavy components of the system as the feeding auger (feeding screw) and the feeding elevator, and in front of the rear table a movable feeding apron with the cutter bar provided in the leading end thereof, the sides of the feeding apron being integrated with the front arms of a pair of levers which are hinged on the rear stationary table about a second horizontal axis of rotation. The reel assembly with its reel is carried by hydraulic extension arms which are pivotable about an axis of rotation on the rear table which is stationary in its set positions or on the leading movable apron, said reel assembly being supported by a pair of hydraulically extendable supporting arms provided to cause the movement of rotation of the extension arms. These supporting arms extend between the extension arms and a foot-point on the movable feeding apron, the feeding apron including the weight of the reel assembly which is supported by feeding apron being counter-balanced about the said second axis of rotation by means of hydraulic cylinders connected to the rear arms of the said levers, the said front arms of which are integrated with the size of the feeding apron. Further, ground following members are provided under the movable feeding apron and connected therewith so that the feeding apron will follow the contour of the ground when the machine is advanced and at the same time raise or lower the reel via the supporting arms connected to the movable feeding apron, therethrough avoiding that the reel will collide with the cutter-bar when it is working in a lower position and the feeding apron is raised by the ground following members because of elevations in the ground contour.

Further features and advantages of the invention will be apparent from the appending claims and from the following description of a preferred embodiment. In the claims are used the expressions first, second, third, fourth and fifth axis of rotation. This terminology shall, however, not be interpreted in a limiting way as far as the number of axes is concerned. The terminology is chosen only in order to distinguish the different axes from one another.

BRIEF DESCRIPTION OF DRAWINGS

In the following description of preferred embodiments, reference will be made to the attached drawings, wherein FIG. 1 is a partly schematic sectional side elevation of a first preferred embodiment of the header according to the invention, the plane of the section being parallel to the crop feeding direction;

FIG. 2 is a side elevation showing the cutter-bar of the header in greater detail;

DESCRIPTION OF PREFERRED EMBODIMENTS

Figure 3:
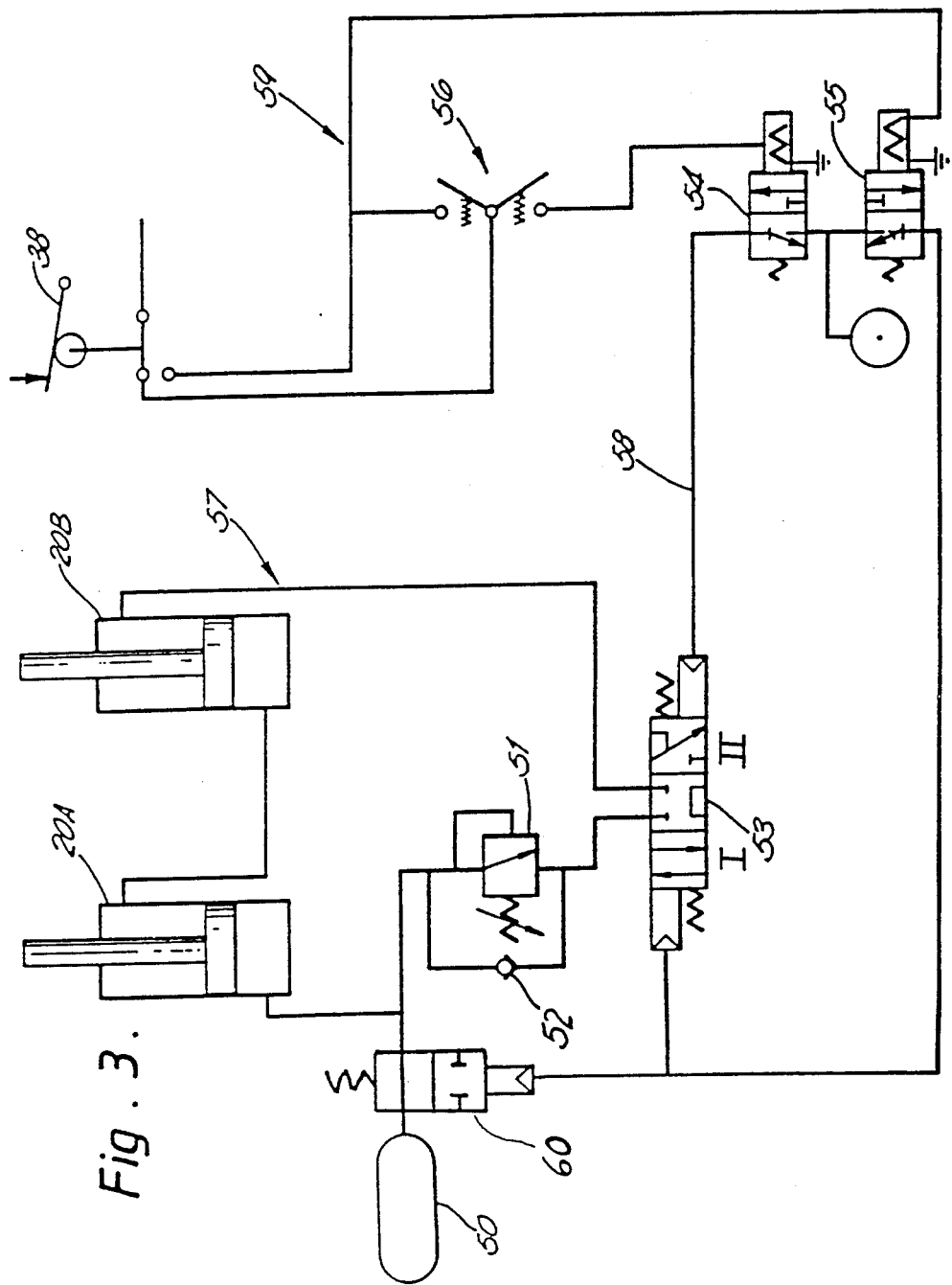
FIG. 3 is a circuit diagram of the regulating system of the header.

The header shown in FIG. 1 cpomprises four major parts, a stationary table 1, a mobile feeding apron 2, a cutter assembly 3, and a reel assembly 4.

The stationary table 1 according to the art comprises a feeding auger 5 and is integrated with an elevator house 6, which comprises an elevator (not shown) transporting the crop into the harvester. The harvester is symbolically designated 7. The stationary table 1 pivots about an axis 8 in the harvester and is turned by a pair of hydraulic cylinders 9 to be set in a chosen position. This set position is characterized by the distance H between the ground and a horizontal first axis 10.

The feeding apron 2 consists of a number of interconnected sections. Each section is provided with an endless feed belt 11, which is driven in the direction of the arrow 12 by a drive pulley 13, powered by a hydraulic motor (not shown). A front pulley is designated 14. The belt 11 is tensioned by means of a pair of gas springs 15. The belt 11 feeds the material from the cutter assembly 3 to the stationary table 1, from where it is transported by the auger 5 and the elevator. The gables of the described feeding apron 2 constitute the front arms 16 of a pair of two-armed levers 18. The rear arms of the two levers have been designated 17. In this manner, the feeding apron 2 is hinged via the gables/lever arms 18 to the stationary table 1, so that the lever arms 18 and hence the apron 2 may pivot about said first turning axis 10, which has been set by the operator at a certain working position, stationary in relation to the harvester 7.

On the underside of the feeding apron 2, across its entire breadth, there are a number of wheels 24 distributed before and behind a support 21. The hubs of the wheels are stiffly attached to the support so as to avoid a bogie truck effect in the assembly. The wheels 24 can be replaced by skids. At each end of the support 21 an internally threaded sleeve 26 extends vertically upwards. In each of the sleeves 26 there is a screw 25 which may be turned by means of a handle 27. Each of the sleeves 26 is attached to the gable of the feeding apron 2, specifically to the front lever arm 16, via a hinge 28. At the top of the sleeve 26 there is a second hinge 29, which is the turning point of a tie rod 30. The second turning point 31 of the tie rod 30 is vertically above the said first turning axis 10. The screw 25 in the threaded sleeve 26 is stiffly attached to the support 21. The described arrangement provides for the wheels 24 to remain in horizontal plane, contrary to the situation with a bogie type assembly, and the sleeve 26 with the screw 25 inside it will always remain vertical. By turning the screw 25 in the sleeve 26 at both sides of the header the feeding apron 2 and hence the cutter assembly 3 may be raised or lowered with respect to the ground.

The reel assembly 4 comprises a pair of extension cylinders 40. At the outer end of the piston rod 41 on each of the extension cylinders 40 the reel 42 is mounted according to prior art. The extension cylinders 40—one of each side of the header—are mounted on an arm 43, which is journalled about the same first turning axis 10 as the feeding apron 2 or, as an alternative, about another turning axis on the table 1. Each of the extension cylinders 40 is supported by a hydraulic cylinder 44 which raises and lowers the extension cylinder 40 and consequently the reel 42. The cylinder 44 is hinged to the gable of the feeding apron 2 by a hinge 45 at its bottom end, in other words at the front arm 16 of the two-armed lever 18. The piston rod of the cylinder 44 is connected to an extension cylinder through a hinge 47.

The apron 2 with its sides or gables 18 as well as the reel assembly 4 including the reel 42 which is supported on the apron 2 are counter-balanced about the turning axis 10 by means of two hydraulic cylinders 20 and a gas accumulator 50, see FIG. 3, integrated in the hydraulic system. The piston rods of the hydraulic cylinders 20 are attached to the rear ends of the rear lever arms 17 of the levers 18.

The cutter assembly 3 comprises, according to prior art, a knife 33 and a drive unit 34. From pre-determined set positions, as determined by an adjustable stop on the mobile feeding apron, the cutter assembly 3, see FIG. 2, may be turned upwards, i.e. clockwise as depicted in FIGS. 1 and 2, about a horizontal second axis 35, which is the turning axis of a two-armed lever. By moving the stop, the cutting angle, i.e. the angle of inclination of the knife 33 to the standing crop may be changed. The front arm of the lever carries the cutter assembly proper, comprising the knife 33 and the drive unit 34, while the second, rear arm consists of a bracket-like horn 36, resting against the adjustable stop. At the extreme end of the horn 36 there is also a gas spring 37, which balances the weight of the cutter assembly 3. A microswitch has been designated 38. Should the cutter assembly 3 run into the ground or into some obstacle, the assembly is turned upwards about the second axis 35. If it turns more than a pre-determined angle, the microswitch 38 is activated, which in turn disconnects a circuit in the regulating system, causing the hydraulic cylinders 20 to lift the feeding apron 2.

Referring now to FIG. 3, the regulating system functions as follows. For the purpose of turning the lever 18 about said first turning axis 10, see FIG. 1, two hydraulic cylinders 20 are provided. In FIG. 3, these have been designated 20A and 20B. The first cylinder 20A is a master cylinder and the second 20B is a slave cylinder. The regulating system comprises the following units: a gas accumulator 50, an adjustable counter-pressure valve 51, with a built-in non-return valve 52, a hydraulic four-way/three position directional valve 53, a first electro-pneumatic three-way/two position directional valve 54, a second electro-pneumatic three-way/two position directional valve 55, a toggle switch 56, a cut-off valve 60, and the micro-switch 38, see FIG. 2. Further, the hydraulic circuit, which is connected to the hydraulic system of the harvester has been designated 57, a pneumatic circuit has been designated 58, and an electric maneouvering circuit has been designated 59.

When the machine is in operation, there is a balanced hydraulic pressure in the accumulator 50, and this pressure is transmitted to the slave cylinder 20B via the master cylinder 20A. The pressure is adjusted so that the wheels 24 of the feeding apron 2 rest on the ground with a slight pressure. In other words, the hydraulic cylinders 20A and 20B keep the feeding apron 2 balanced against the ground with a pre-determined hydraulic pressure via the valve 51. Unevenness of the ground, being detected by the wheels 24 and via the sleeve 26, the shaft 28 and the lever arm 16 causing the lever 18 to turn about the axis 10, thus affecting the cylinders 20A and 20B, is absorbed by the spring action of the accumulator 50. The valve 53 is put in working position, position II, by the toggle switch 56. The instruction to the valve 53 to assume working position is passed on from the toggle switch 56 by the first electro-pneumatic valve 54. The operating current to the first electro-pneumatic valve 54 is supplied via the toggle switch 56 from the micro-switch 38.

Should the cutter assembly 3 run into some mechanical obstruction and be forced upwards a certain angle about the second axis 35, the micro-switch 38 will disconnect the first electro-pneumatic valve 54, even if the toggle switch 56 is in working position. Instead, current will flow to the second electro-pneumatic switch 55, which will give an up-instruction to the valve 53, position I. This will cause the cut-off valve 60 to lock-in the pressure in the accumulator 50 so as to give preference for the hydraulic oil to flow from valve 53 to the cylinders 20A, 20B, so that the cylinders 20A and 20B immediately lift the entire feeding apron 2 and hence also the reel assembly 4 by pressing the rear lever arms 17 of the lever 18 down. Then a hydraulic pressure is built up in the accumulator 50, via the valve 51 and the built-in non-return valve 52. After a certain period of time, determined by the slowness of the gas spring 37, the cutter assembly 3 will sink back down until the horns 36 engage the stop and the micro-switch 38 is closed again. As soon as the micro-switch 38 resumes its closed normal position, the feeding apron 2 falls down until the wheels 24 rest on the ground. It is to be appreciated, that the reel assembly 4 is moved along with all these movements, since the extension cylinders 40 are supported by the feeding apron 2. The effect is that there is no risk of the reel 42 running into the cutter-bar 3, as the feeding apron 2 is raised together with the cutter assembly 3, so that the "floating" wheels 24 leave the ground, when the cutter assembly 3 runs into some obstruction.

When in transport position, it is desirable that the feeding apron 2 with the cutter assembly 3, the wheels 24, and the reel assembly 4 are temporarily lifted to a higher position. The operator can accomplish this by feeding an up-instruction to the hydraulic cyinders 20A and 20B via the toggle switch 56, up position, which makes the pneumatohydraulic valve 53 give an up-impulse, position I, until the operator lets go of the toggle switch 56. The valve 53 then stops in zero position, locking the entire system in the up position. To resume working position, the operator puts the toggle switch 56 into working position, thus causing the feeding apron 2 to sink to an operating position, determined by the setting of the wheels 24 and by the pre-determined hydraulic pressure in the cylinders 20A and 20B, balancing the feeding apron 2 and the reel assembly 4.

Figure 4:
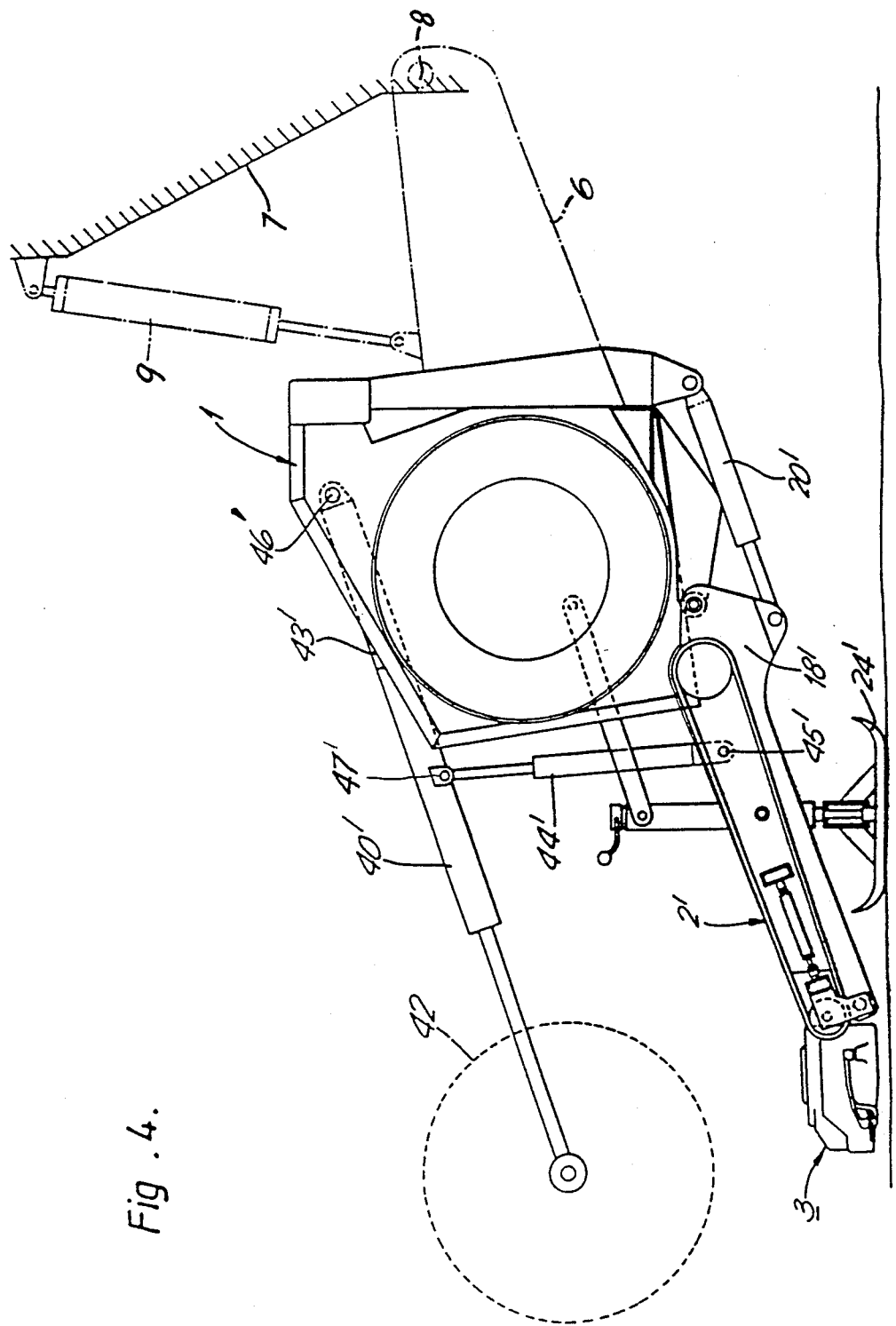
FIG. 4 shows a second embodiment of the header according to the invention.

In the embodiment according to FIG. 4, details which have been modified or displaced in comparison to the embodiment of FIG. 1 have been indicated by a prime. Thus, there are hydraulic cylinders 20', arranged below the stationary table 1 to turn the mobile feeding apron 2'. The wheels have been replaced by skids 24'. The rear lever arm is shorter and is designated 18'. In this case the extension arm 43' is hinged to the stationary table 1 by a hinge 46'. The lifting cylinder 44', the piston rod of which is connected to the extension cylinder 40' through a hinge 47', is pivotally connected at its bottom end to the mobile feeding apron 2' by a hinge 45'. In this case also the reel assembly 42 is raised together with the mobile feeding apron 2', if the cutter assembly 3 runs into some obstruction, or if the feeding apron 2' is raised by the skids 24', which follow the ground, and the balanced hydraulic system, the reel 42 thus in both cases being prevented from running into the cutter assembly 3, when the reel 42 is working in its lowermost position. The rest of the construction is unchanged.

We claim:

1. Apparatus for a harvesting machine, comprising:
   a reel assembly, including a reel;
   a rear table comprising a feeding auger and a feeding elevator, said rear table having a front and a rear and being pivotable relative to said harvesting machine about a first horizontal axis of rotation;
   a pair of reel carrying arms pivotally mounted about an axis of rotation on said rear table for carrying said reel;
   a movable feeding apron mounted in front of said rear table, said apron having sides;
   a cutter bar assembly provided at a leading end of said movable feeding apron;
   a pair of levers hingedly mounted on said rear table about a second horizontal axis of rotation, said levers having front arms and rear arms, said sides of said feeding apron being connected to said front arms;
   first hydraulic means mounted relative to said machine for pivotally moving said rear table about said first horizontal axis;
   second hydraulic means for supporting said reel assembly and causing pivotal movement of said pair of reel carrying arms, said second hydraulic means extending between said pair of reel carrying arms and a mounting point on said movable feeding apron;
   third hydraulic means connected to said rear arms of said levers for counter-balancing said feeding apron and said reel assembly supported by said feeding apron about said second axis of rotation; and
   ground following means connected under said movable feeding apron for causing said feeding apron to follow a ground contour when said machine is advanced while at the same time raising or lowering said reel via said pair of reel carrying arms, thereby avoiding collisions between said reel and said cutter bar assembly when said cutter bar assembly is working in a lower position and said feeding apron is raised by said ground following means due to elevation of said ground contour.

2. Apparatus according to claim 1, wherein said second horizontal axis of rotation is provided in said front of said rear table.

3. Apparatus according to claim 2, wherein said mounting point coincides with a third horizontal axis of rotation provided in front of said second axis of rotation.

4. Apparatus according to claim 3, wherein said ground following means are connected with said movable feeding apron through connecting members which are coupled to said front arms via a pivot hinge provided for each of said arms, said pivot hinge having an axis of rotation defining a fourth horizontal axis of rotation.

5. Apparatus according to claim 1, 2, 3, or 4, and further including a fifth horizontal axis of rotation at said front end of said feeding apron, about which a leading assembly having a front end is balanced and pivots; detectors arranged to signal if said leading assembly is turned upwards by a certain angle about said fifth axis of rotation if it collides with a stationary obstacle; and regulating means for activating said third hydraulic means when receiving a signal from said detectors, thus causing said levers to turn about said second horizontal axis of rotation and thereby to raise said feeding apron, said leading assembly in said front end thereof and said ground following means leaving the ground, whereby said leading assembly clears said obstruction without colliding with said reel if said reel is operating in a lower position.

6. Apparatus according to claim 5, wherein said leading assembly includes a cutter bar assembly.

7. Apparatus according to claim 4, wherein said third and fourth axes of rotation are provided between said second and fifth axes of rotation.

* * * * *